(12) United States Patent
VerSteeg et al.

(10) Patent No.: US 7,895,635 B2
(45) Date of Patent: Feb. 22, 2011

(54) SYSTEMS AND METHODS OF ASSEMBLING AN ELEMENTARY STREAM FROM AN ENCAPSULATED MULTIMEDIA TRANSPORT STREAM

(76) Inventors: William C. VerSteeg, 330 Guildhall Grove, Alpharetta, GA (US) 30022; Robert G. Stephens, 1070 Lexington Ct., Bishop, GA (US) 30621

(*) Notice: Subject to any disclaimer, the term of this patent is extended or adjusted under 35 U.S.C. 154(b) by 718 days.

(21) Appl. No.: 11/829,309

(22) Filed: Jul. 27, 2007

(65) Prior Publication Data

US 2008/0005776 A1 Jan. 3, 2008

Related U.S. Application Data

(63) Continuation-in-part of application No. 11/428,351, filed on Jun. 30, 2006.

(51) Int. Cl.
*H04N 7/16* (2006.01)

(52) U.S. Cl. .................. 725/139; 725/131; 725/151

(58) Field of Classification Search .............. 725/110, 725/131–132, 134, 151, 152, 139; 370/389, 370/420, 463
See application file for complete search history.

(56) References Cited

U.S. PATENT DOCUMENTS

| | | | |
|---|---|---|---|
| 5,568,614 A | 10/1996 | Mendelson et al. | |
| 5,805,821 A | 9/1998 | Saxena et al. | |
| 5,959,659 A | 9/1999 | Dokic | |
| 6,246,683 B1 | 6/2001 | Connery | |
| 6,427,173 B1 | 7/2002 | Boucher et al. | |
| 7,039,048 B1 | 5/2006 | Monta et al. | 370/389 |
| 2002/0023270 A1 | 2/2002 | Thomas et al. | |
| 2004/0125754 A1 | 7/2004 | Johnson | 370/257 |
| 2006/0174032 A1 | 8/2006 | Winchester et al. | |
| 2008/0022321 A1 | 1/2008 | Ver Steeg et al. | |

(Continued)

FOREIGN PATENT DOCUMENTS

WO 0227519 A 4/2002

(Continued)

OTHER PUBLICATIONS

International Search Report on PCT/US07/072431 dated Feb. 14, 2008.

(Continued)

*Primary Examiner*—Ngoc Vu
(74) *Attorney, Agent, or Firm*—Merchant & Gould (57) ABSTRACT

Systems and methods of assembling an elementary stream from an encapsulated multimedia transport stream are disclosed. An exemplary method includes: receiving a command from a user mode video playback component; in response, processing layer-2 packets received through a network interface driver binding to assemble, into an MPEG elementary stream, multimedia transport packets encapsulated within; and supplying the stream to a decoder. The receiving and processing steps are performed in kernel mode. Also disclosed is an exemplary digital home communication terminal that includes a network interface, memory, and a processor. The processor executes code to: receive a command from a user mode video playback component; process layer-2 packets received through a network interface driver binding, in order to assemble into an MPEG elementary stream multimedia transport packets encapsulated within the received layer-2 packets; and supply the elementary stream to a decoder. The receive and process operations are performed in kernel mode.

20 Claims, 10 Drawing Sheets

U.S. PATENT DOCUMENTS

2008/0313687 A1* 12/2008 Rajakarunanayake ....... 725/110

FOREIGN PATENT DOCUMENTS

WO     WO 2007/064135 A1     6/2007

OTHER PUBLICATIONS

Woodsie C.M., et al., "The Protocol Bypass Concept for High Speed OSI Data Transfer," Protocols for High Speed Networks, Proceedings of the IFIP International Workshop, North Holland, Amsterdam, NL, Nov. 1990, pp. 1-16.

Salkintzis A.K.; Fitzek FHP; Seeling, P; Reisslein M.: "Mobile Internet, C.11: Video Streaming in Wireless Internet" 2004, CRC Press, http://www.engnetbase.com.

International Preliminary Report dated Feb. 2, 2010 cited in Application No. PCT/US2008/070691.

International Preliminary Report dated Jan. 6, 2009 cited in Application No. PCT/US2007/072431.

European Communication dated May 15, 2009 cited in Application No. 07 812 457.5-1522.

U.S. Office Action dated Nov. 4, 2008 cited in U.S. Appl. No. 11/428,351.

U.S. Office Action dated May 13, 2009 cited in U.S. Appl. No. 11/428,351.

U.S. Final Office Action dated Dec. 1, 2009 cited in U.S. Appl. No. 11/428,351.

European Communication dated Dec. 1, 2010 cited in Application No. 08 782 167.4.

* cited by examiner

SYSTEMS AND METHODS OF ASSEMBLING AN ELEMENTARY STREAM FROM AN ENCAPSULATED MULTIMEDIA TRANSPORT STREAM

CROSS REFERENCE TO RELATED APPLICATIONS

This application is a continuation-in-part of U.S. application Ser. No. 11/428,351, filed Jun. 30, 2006, which is hereby incorporated by reference in its entirety.

FIELD OF THE DISCLOSURE

The present disclosure relates to digital set-tops, and more specifically, to systems and methods of assembling an elementary stream from an encapsulated multimedia transport stream.

BACKGROUND

A growing number of consumers now have high-speed, or broadband, connections to the Internet in their homes. The increased bandwidth provided by these broadband connections allows the delivery of digital television and/or video services to home consumers. One such technology uses one or more protocols in the Internet Protocol (IP) family as a delivery mechanism. This technology is referred to as IP television, or IPTV.

The IP family of protocols uses a layered approach, with IP itself acting as the network-layer protocol. Sitting on top of the IP network layer is a transport layer such as TCP (Transmission Control Protocol) or User Data Protocol (UDP). The IP family also includes a variety of session-layer protocols above the transport-layer, such as Real-Time Transport Protocol (RTP) and Session Description Protocol (SDP). IPTV delivers video or television as a Motion Pictures Experts Group (MPEG) transport stream, carried by UDP/IP, or RTP/UDP/IP. Thus, a number of MPEG transport stream (TS) packets are encapsulated into each UDP or RTP packet.

By using the IP family of protocols to deliver an MPEG transport stream to a set-top, service providers can take advantage of the existing IP network infrastructure, which is substantial. However, the protocol layers that allow successfull delivery of packets across the Internet can be a problem when processing the packet in the set-top. In a set-top using a conventional design, merely moving the constant stream of high-speed video packets up the layered protocol stack can consume a significant amount of processor time. This leaves little processor time for other tasks, such as transmitting packets or responding to user input. As a result, the user can experience a slow response time to set-top applications, for example, as when scrolling through an on-screen program guide. Thus, a need arises for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The embodiments disclosed herein provide systems and methods for assembling an elementary stream from an encapsulated multimedia transport stream in an IPTV environment. One such embodiment includes kernel mode code which receives layer-2 packets through a binding to a network interface driver. Kernel mode code also receives a command from a user mode video playback component. In response to the received command, the received layer-2 packets are processed, in kernel mode, in order to assemble the multimedia transport packets that are encapsulated within the received layer-2 packets into an MPEG elementary stream. (Here, "multimedia" includes media types such as video and audio, and a person of ordinary skill in the art should understand that an elementary stream contains a single type of media.) Kernel mode code also supplies the MPEG elementary stream to a decoder.

Figure 1:
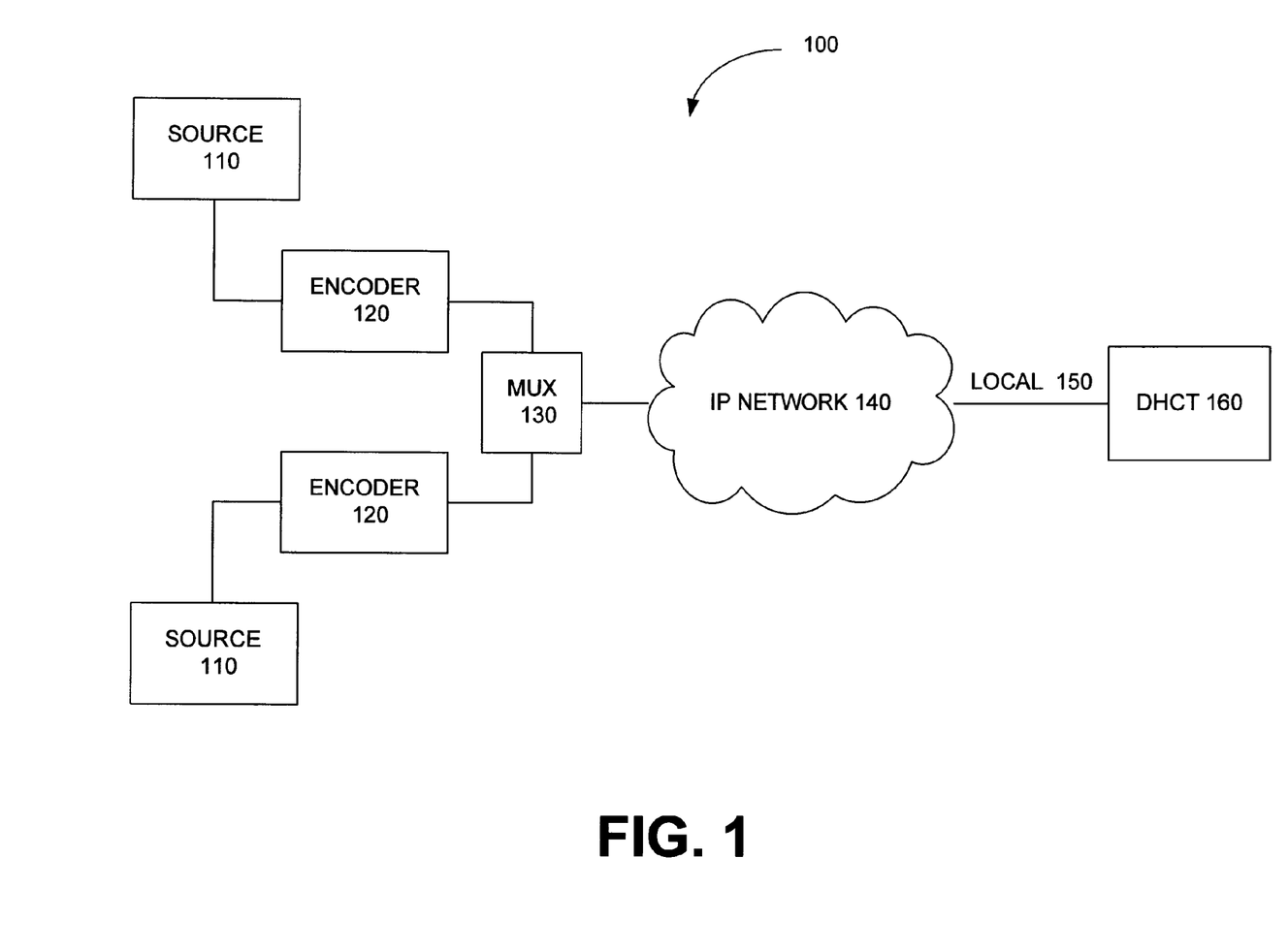
FIG. 1 is a block diagram of an environment in which one embodiment of a system and method for assembling an elementary stream from an encapsulated multimedia transport stream is located.

FIG. 1 is a block diagram of an environment in which one embodiment of a system and method for assembling an elementary stream from an encapsulated multimedia transport stream is located. System 100 delivers digital television and/or video services to subscribers using the Internet Protocol (IP). System 100 comprises: one or more broadcast sources 110; one or more broadcast encoders 120; a broadcast multiplexer 130; an IP network 140; a broadband subscriber connection 150; and a digital home communication terminal (DHCT) 160.

Broadcast sources 110, such as cable networks or on-air television stations, provide television or video programming. Broadcast encoders 120 take as input an analog signal digital stream from broadcast source 110, and output a stream that is compressed and formatted. Broadcast multiplexer 130 multiplexes encoded broadcast streams into a single stream.

The stream is transmitted through IP network 140, then over broadband subscriber connection 150 to DHCT 160, which converts the stream of IP packets into a standard analog or digital video signal. DHCT 160 supplies the video signal to a display (not shown) for viewing by the customer. In one embodiment, the display is a television. In another embodiment, the display is a computer monitor.

In some embodiments, DHCT 160 also provides interactive features, such as an electronic program guide (EPG), Web browser, e-mail, and DVR (digital video recorder) functionality. In some embodiments, DHCT 160 takes the form of a set-top box. In others, DHCT 160 is implemented by a personal computer (PC).

Figure 2:
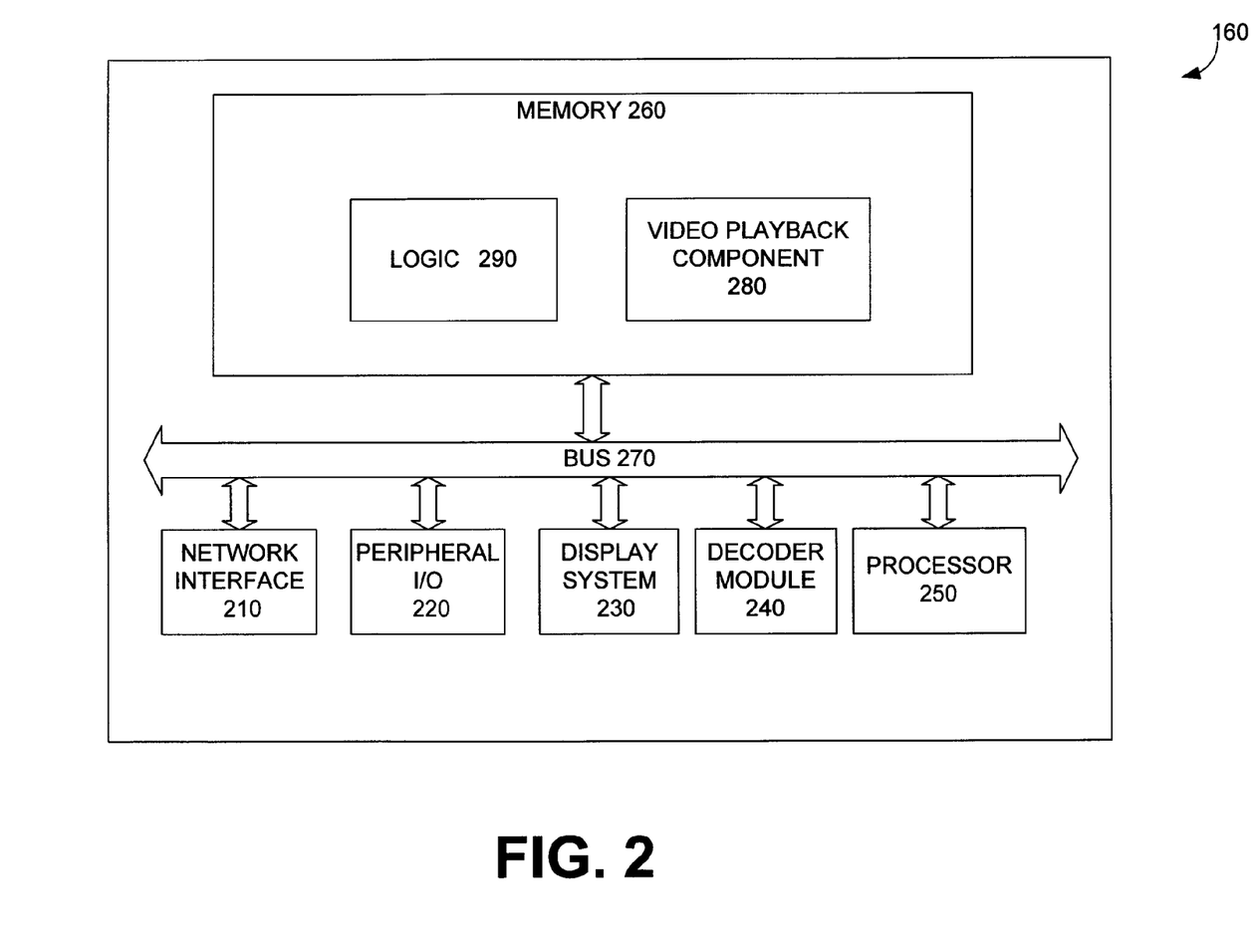
FIG. 2 is a block diagram showing selected components of a digital home communication terminal (DHCT) which implements some of the systems and methods of assembling an elementary stream from an encapsulated multimedia transport stream, disclosed herein.

FIG. 2 is a block diagram showing selected components of a DHCT 160 which implements one of the systems and methods of assembling an elementary stream from an encapsulated multimedia transport stream disclosed herein. DHCT 160 comprises: a network interface 210; a peripheral I/O interface 220; a display system 230; a decoder module 240; a processor 250; and memory 260. These components are coupled by a bus 270.

Network interface 210 receives a stream of IPTV packets from broadband subscriber connection 150. Memory 260 contains instructions that are executed by processor 250 to control operations of DHCT 160. Residing in memory 260 is a video/television playback component 280. Video playback component 280 allows a user to tune to a particular channel and watch a live broadcast, or to playback a program recorded to storage (not shown), by directing an MPEG stream encapsulated within the IPTV packets to decoder module 240. Memory 260 also includes stream assembly logic 290. In this example embodiment, logic 290 is separate from video playback component 280, but in other embodiments logic 290 is combined with video playback component 280.

Decoder module 240 decodes the incoming MPEG stream into a stream of decoded video frames. In some embodiments, decoder 240 also performs demultiplexing of multiple streams (e.g., audio and video). In some embodiments, decoder 240 also decrypts the MPEG stream. Display system 230 converts the decoded video frames into a video signal for display by a computer monitor or a television. Peripheral I/O interface 220 provides input and output signals, for example, user inputs from a remote control or front panel buttons or a keyboard, and outputs such as LEDs or LCD on the front panel.

As described above, DHCT 160 receives digital television and/or video through IP network 140. In some embodiments, DHCT 160 also receives digital television/video from a head-end system over a hybrid fiber-coax (HFC) transport network (not shown). In these embodiments, DHCT 160 includes a tuner/demodulator (not shown) which processes the digital signals received from the head-end over the HFC connection.

Omitted from FIG. 2 are a number of conventional components, known to those skilled in the art, that are unnecessary to explain the operation of the systems and methods of assembling an elementary stream from an encapsulated multimedia transport stream disclosed herein. A person of ordinary skill in the art should understand that software components referred to herein includes executable code that is packaged, for example, as a standalone executable file, a library, a shared library, a loadable module, a driver, or an assembly, as well as interpreted code that is packaged, for example, as a class.

Figure 3:
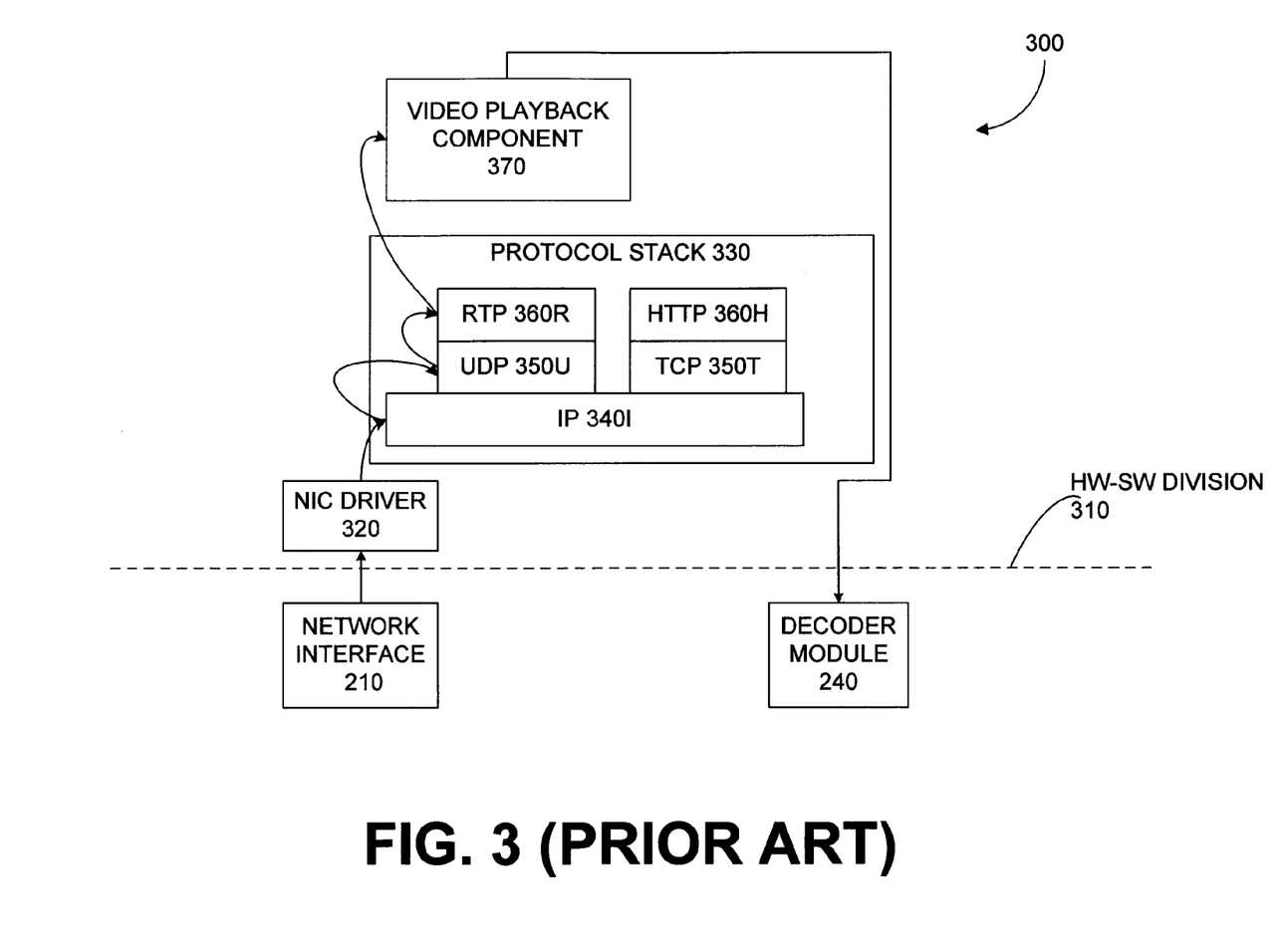
FIG. 3 is a data flow diagram showing how received IPTV packets flow through the various components of a conventional DHCT.

FIG. 3, labeled "PRIOR ART", is a data flow diagram showing how received IPTV packets flow through the various components of a conventional DHCT 300. The division between hardware components and software components is represented by line 310: below line 310 are the hardware components network interface 210 and decoder module 240; above line 310 are software components, which are executed from system memory 260 by processor 250 (see FIG. 2).

Network interface 210 receives packets from broadband subscriber connection 150 which are in a particular layer-1 format, specific to the type of connection (e.g., DSL, twisted-pair Ethernet, etc.). Network interface (NIC) driver 320 is the software component that communicates with the hardware network interface 210. Together, network interface 210 and NIC driver 320 implement layer-2, or the Media Access Control (MAC) layer. Thus, network interface 210 and/or NIC driver 320 remove the layer-2 packet that is encapsulated within the layer-1 frame (i.e., remove a layer-1 header and trailer from the incoming frame).

NIC driver 320 provides incoming layer-2 packets to protocol stack 330. Protocol stack 330 is itself composed of multiple layers, where each layer may consist of more than one protocol. Here, a layer-3 or network layer includes IP (3401), a layer-4 or transport layer includes UDP (350U) and TCP (350T), and a session layer includes RTP (360R) and HTTP (360H). Each layer examines its own layer-specific header and/or trailer, processes the packet accordingly, and passes the packet up to the appropriate protocol above.

The amount of processing varies according to the protocol. Some protocols, such as IP (3401) and UDP (350U), include a checksum in the trailer. These protocols compute a checksum on the received packet and compare the computed checksum with the checksum in the trailer. Only if the checksum matches is the packet passed on to the layer above.

When a particular layer is bound to more than one protocol above it, the layer underneath uses information in the header to determine which upper layer protocol gets the packet. For example, IP (3401) uses a protocol type field in the IP header to determine whether the received packet is forwarded up to UDP (350U) or TCP (350T).

The data rates associated with IPTV are relatively high: a video stream at standard definition TV resolution uses 2-7 Mbits/sec of bandwidth, and a high definition stream uses 14-20 Mbits/sec. At these data rates, the various processing tasks performed by the layers of protocol stack 330 in a conventional set-top design add up to a significant amount of processor time. In addition, each passing of the packet from one layer to another results in a context switch, from one task/thread/process to another. In a conventional set-top, the combination of these factors reduces the amount of time available for video playback component 370, and for any other applications.

Figure 4:
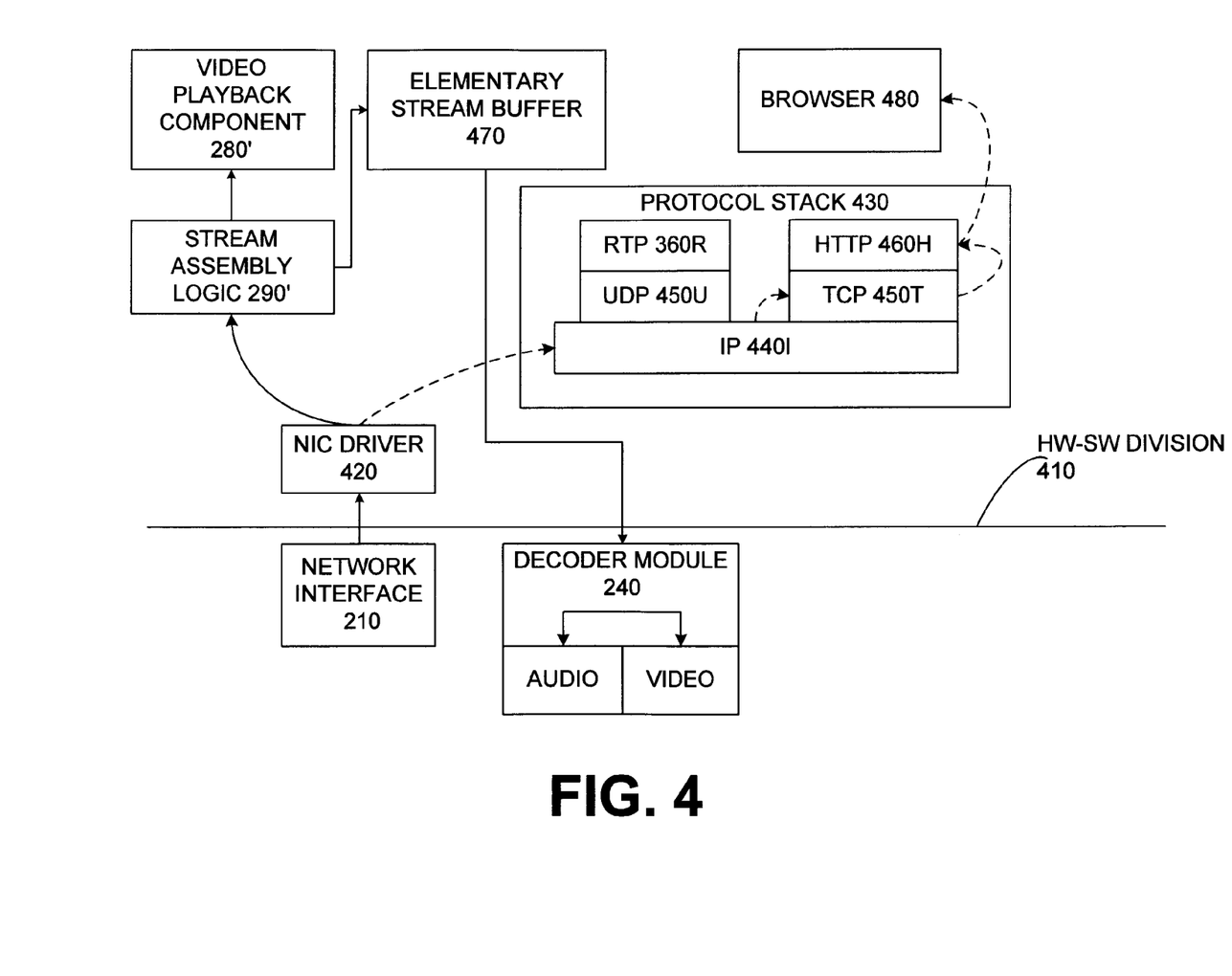
FIG. 4 is a data flow diagram of received IPTV packets moving through the various components of the DHCT of FIG. 1 in accordance with exemplary embodiment of video playback component and stream assembly logic.

FIG. 4 is a data flow diagram of received IPTV packets moving through the various components of DHCT 160 in accordance with exemplary embodiments of video playback component 280 and stream assembly logic 290 (280' and 290', respectively). Although DHCT 160 shares some similarities with conventional DHCT 300 in FIG. 3, stream assembly logic 290' in DHCT 160 reduces the amount of time that the processor spends moving each packet in the IPTV stream from NIC driver 420 to video playback component 280'.

The division between hardware components and software components is represented by line 410: below line 410 are the hardware components; above line 410 are software components, which are executed from system memory 260 by processor 250 (see FIG. 2).

Together, network interface 210 and NIC driver 420 implement layer-2 or the MAC layer, extracting layer-2 packets from the layer-i packets received on broadband subscriber connection 150. NIC driver 420 provides incoming layer-2 packets to protocol stack 430. Protocol stack 430 is itself composed of multiple layers, where each layer may consist of more than one protocol. The layers and protocols in this example embodiment include network-layer protocol IP (440I), transport-layer protocols UDP (450U) and TCP (450T), and session layer protocols RTP (460R) and HTTP (460H).

Instead of being bound to protocol stack 430, video playback component 280' is bound to stream assembly logic 290', which is in turn bound to NIC driver 420. Stream assembly logic 290' receives a layer-2 packet from NIC driver 420 and removes the MPEG transport stream (TS) packets encapsulated within. The TS packets are assembled in a buffer 470 to produce an MPEG elementary stream usable by video playback component 280' and/or decoder module 240. In the assembly process, some embodiments of stream assembly logic 290' perform filtering on various network and transport layer headers, so that not all packets received by stream assembly logic 290' become part of the assembled elementary stream residing in buffer 470.

In this example embodiment, elementary stream buffer 470 is located in system memory 260. In another embodiment (not shown) buffer 470 is located within decoder module 240, but is accessible by software components (e.g., the buffer has a memory-mapped interface). A person of ordinary skill in the art should understand the various mechanisms which can be used to coordinate software and hardware access to buffer 470 (e.g., mailbox registers, interrupts).

Stream assembly logic 290' notifies video playback component 280' of the arrival of new data in elementary stream buffer 470. Video playback component 280' controls the operation of decoder module 240, instructing decoder module 240 to process TS packets from elementary stream buffer 470.

Decoder module 240 uses the Program Identifiers (PIDs) contained within each TS packet to demultiplex the stream, delivering each TS packet to a decoder that is appropriate for the PID. For example, audio packets are delivered to an audio decoder while video packets are delivered to a video decoder. In some embodiments, decoder module 240 also decrypts the TS packets before decoding.

The details of the packet processing and assembly performed by stream assembly logic 290' will be discussed in more detail below in connection with FIG. 5. However, a person of ordinary skill in the art should recognize from this brief overview that bypassing protocol stack 430 allows stream assembly logic 290' to deliver packets in the IPTV stream to video playback component 280' in an expedited manner, reducing the amount of work done on the packets by processor 250. In contrast, the video playback component 370 of conventional DHCT 300 (see FIG. 3) is coupled to protocol stack 330, so that packets must traverse protocol stack 330 for delivery to video playback application 370.

In one embodiment, DHCT 160 runs a variation of Unix or Linux as an operating system, and stream assembly logic 290' binds to NIC driver 420 using a socket interface. More specifically, in this embodiment stream assembly logic 290' uses the API call socket( ) to create a socket, then setsockopt( ) to set the socket type to SOCK_RAW the protocol to ETH_P_ALL. The sockets( ) call is optionally followed by a call to bind( ), specifying the Ethernet address of the NIC hardware 210.

In the embodiments described herein, stream assembly logic 290' receives complete layer-2 packets from NIC driver 420, in which the received packets contain a layer-2 header (e.g., Ethernet destination address, Ethernet source address, and Ethernet frame length). In another variation, stream assembly logic 290' receives layer-3 packets from NIC driver 420, in which the layer-2 header has been removed, so that the first bytes in the received packet are the IP header rather than the Ethernet header. Receiving packets with complete layer-2 headers is known as "raw mode," while "cooked mode" refers to packets in which the layer-2 headers have been stripped. Since stream assembly logic 290' does not need the layer-2 header, either raw or cooked packets will work.

Although video playback component 280' uses stream assembly logic 290' to bypass protocol stack 430, other applications use the services provided by protocol stack 430. NIC driver 420 hands off packets to protocol stack 430, which determines which socket(s) have registered for packet processing, based on the packet type. If the socket has signaled for special processing, the packet is passed off to stream assembly logic 290'. Otherwise, the packet is passed up through protocol stack 430.

In this example, a browser application 480 binds to protocol stack 430. Browser 480 uses the session protocol HTTP (460H), which in turn relies on TCP (450T) and IP (440I). Thus, applications such as browser 480 may coexist in DHCT 160 with stream assembly logic 290' and video playback component 280'. Examples of other co-existing applications are games and text messaging.

Figure 5:
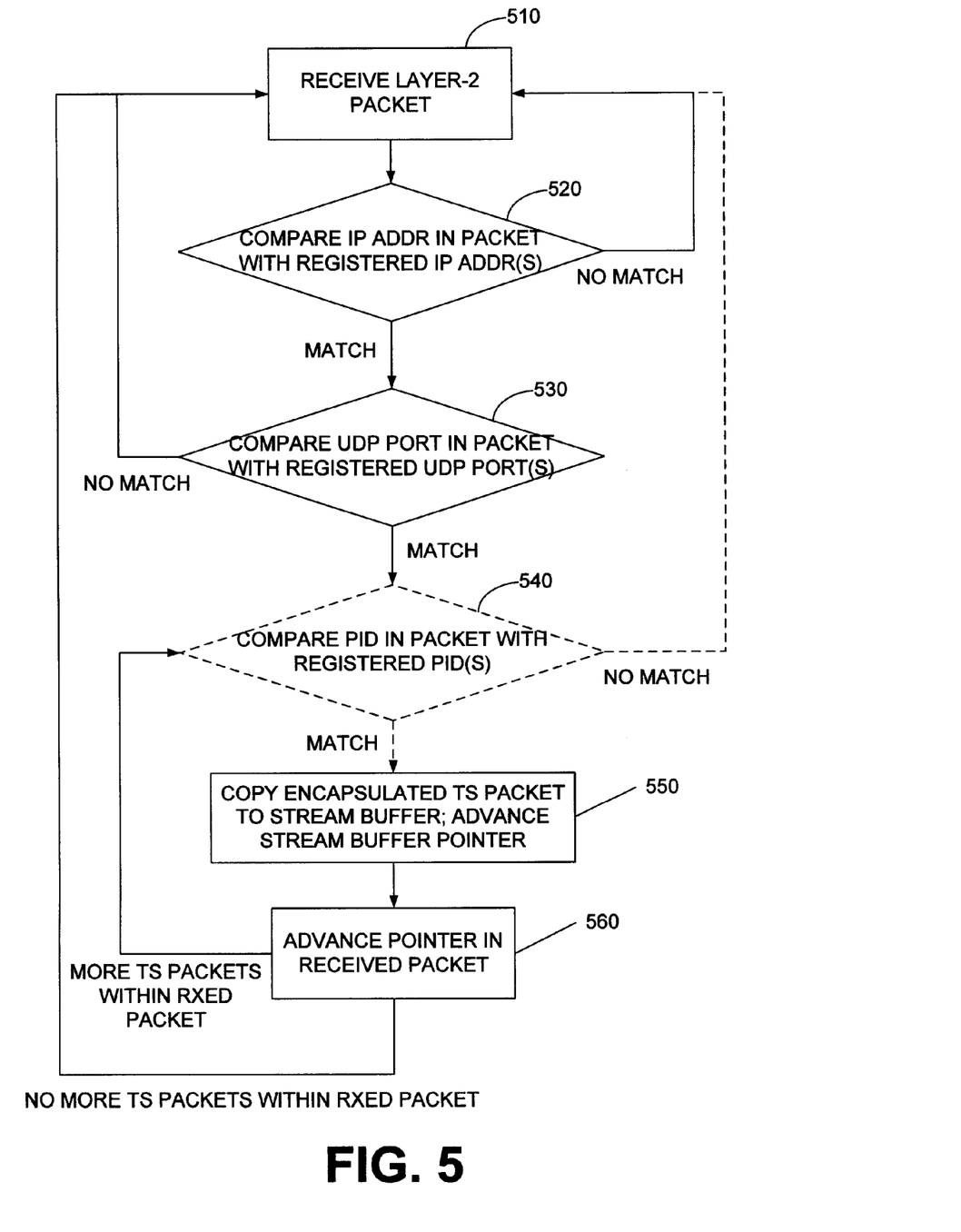
FIG. 5 is a flowchart of the stream assembly logic from FIG. 4.

FIG. 5 is a flowchart of stream assembly logic 290'. Processing begins at block 510, where a layer-2 (e.g., Ethernet) packet is received. Next, at block 520, the destination IP address in the IP header of the received packet is compared to one or more IP addresses which video playback component 280' has registered with stream assembly logic 290'. In a typical IPTV environment, the destination IP address will be a multicast address.

If the destination IP address does not match, processing of this packet is finished, and control returns to block 510 to wait on the arrival of the next packet. If a match on the destination UDP port is found, then processing of the received packet continues at block 530, where the destination port in the UDP header of the packet is compared to one or more UDP ports which video playback component 280' has registered with stream assembly logic 290'.

If the destination UDP port does not match, processing of this packet is finished, and control returns to block 510 to wait on the arrival of the next packet. If a match on the destination UDP port is found, then some embodiments of stream assembly logic 290' perform PID processing. In such embodiments, at block 540 the Packet Identifier (PID) in the MPEG Transport Stream (TS) packet header is compared to one or more PIDs which video playback component 280' has registered with stream assembly logic 290'. (The dashed lines of block 540 indicate this functionality is optional.) In other embodiments, a decoder module 240 does PID parsing in hardware. A person of ordinary skill in the art should appreciate that there are a variety of mechanisms that support PID parsing by the decoder module 240. For example, the data may be put into a contiguous block and passed to the decoder module 240, or the data may be put into scatter-gather buffers and passed to the decoder module 240.

If the PID matches, or if no PID processing is performed by stream assembly logic 290', then the MPEG TS packet is copied (block 550) to the next location in stream buffer 470, and the stream buffer pointer is advanced. Then a receive packet pointer or index is advanced (block 560) to address the next TS packet in the received layer-2 packet. If the last TS packet has been processed, then processing of this packet is complete, and control returns to block 510. Otherwise, the PID comparison of block 540 is repeated using the PID in the next TS packet header.

A person of ordinary skill in the art should understand the structure and layout of IP, UDP, and MPEG TS packets and headers, so offsets within headers and header/packet lengths will not be discussed here. The comparison of header fields to registered values described above can be viewed as applying filters to the received layer-2 packet. Such a person should also realize that these filters may be applied singly, or in combination, and that other such filters, using other fields, are also possible. Thus, various embodiments of stream assembly logic 290' using different packet filters are contemplated.

A person of ordinary skill in the art should further understand the mechanism which video playback component 280' uses to register an IP multicast address or an Ethernet multicast address with stream assembly logic 290', for example, using socket options. Such a person should understand how IP multicast addresses are mapped to Ethernet multicast addresses, as specified in the RFC 1112 standard.

In the embodiments described above, stream assembly logic 290' does not perform a checksum on the IP packet encapsulated in the received layer-2 packet, or on the UDP packet encapsulated in the IP packet. Although a checksum is important in some environments, it is less important for IPTV: a stream containing corrupted video frames can nonetheless be decoded, and even if the viewer sees artifacts, this may be acceptable to the viewer. However, in alternative embodiments, stream assembly logic 290' computes one or more checksums on the received layer-2 packet, for example, an IP checksum or a UDP checksum. In one of these alternative embodiments, the checksum is computed in hardware, for example, by a field programmable gate array (FPGA) or application-specific integrated circuit (ASIC).

Figure 6:
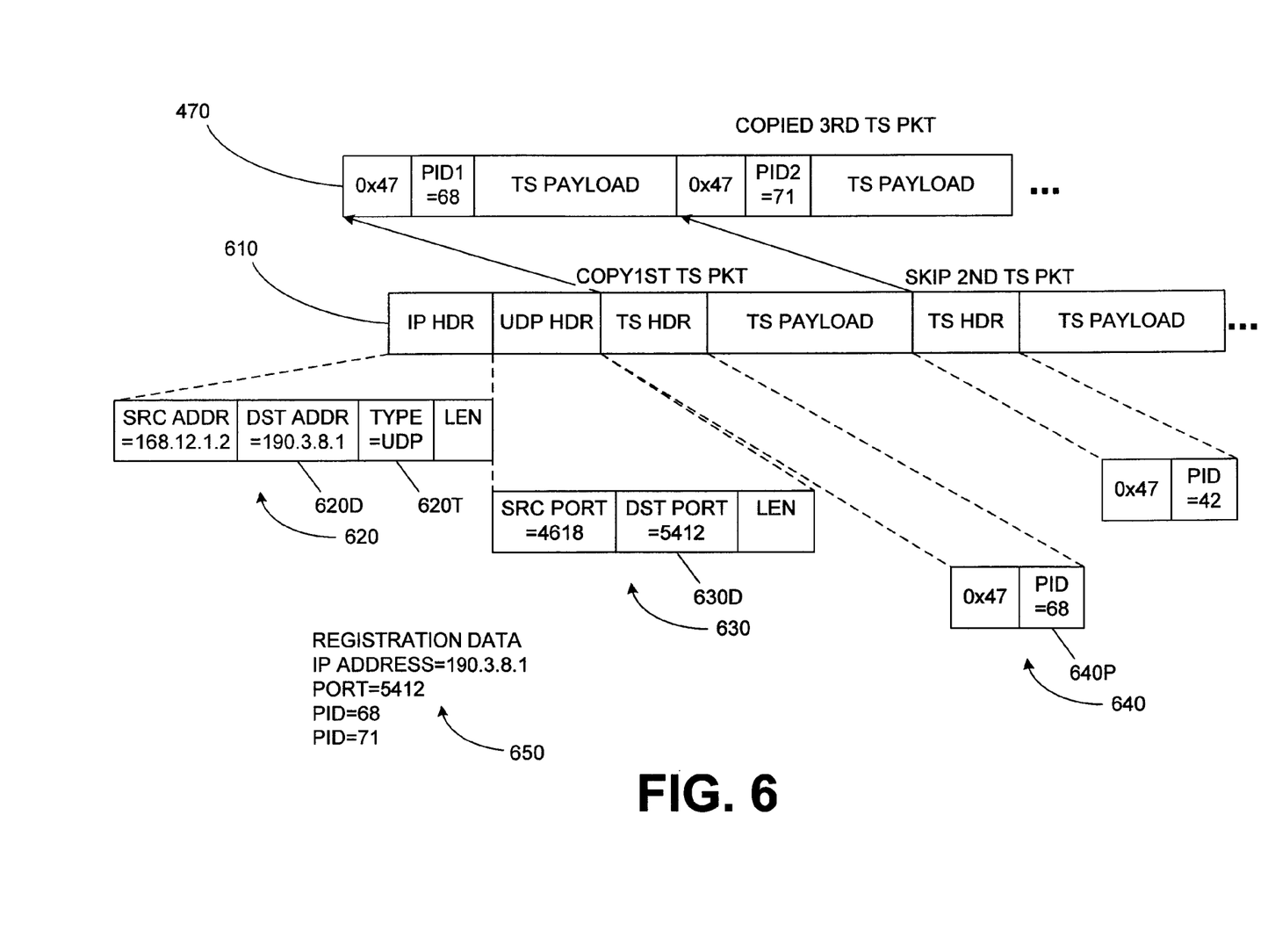
FIG. 6 is a data flow diagram for one embodiment of the stream assembly logic from FIG. 4.

FIG. 6 is a data flow diagram showing the assembly of an elementary stream by stream assembly logic 290' in an example scenario. Stream assembly logic 290' receives an IPTV packet 610 from NIC driver 420. Packet 610 includes an IP header 620, a UDP header 630, and an MPEG Transport Stream (TS) header 640, encapsulated as shown in FIG. 6. The headers depicted in FIG. 6 have been simplified, and therefore contain only a subset of the actual header fields. Furthermore, the fields in FIG. 6 may appear in a different order than in an actual header. In this embodiment, packet 610 is a "cooked" packet, which means the layer-2 header has already been removed, but a person of ordinary skill in the art should understand how a "raw" layer-2 packet is handled by adjusting packet layout and offsets as appropriate.

IP header 620 is composed of various fields, including a destination address 620D, and a protocol type 620T. Stream assembly logic 290' examines the contents of destination address 620D, and compares the packet address to one or more IP addresses registered by a component such as video playback component 280'. In this example scenario, the value of destination address 620D is "190.3.8.1", which does match one of the IP addresses contained in registration data 650.

Since an IP address match was found, stream assembly logic 290' continues filtering packet 610 by examining protocol type 620T. In this embodiment, UDP is used as a transport layer for IPTV packets, so protocol type 620T is compared to the fixed value which represents the UDP protocol type. In this scenario, the value of protocol type 620T matches the UDP type, so filtering continues.

The next encapsulated header, UDP header 630, is examined by stream assembly logic 290'. UDP header 630 contains various fields, including a destination port 630D. Stream assembly logic 290' examines the contents of destination port 630D, and compares the port to one or more UDP ports registered by video playback component 280'. In this example, the value of destination port 630D is 5412, which does match one of the UDP ports contained in registration data 650.

Now that stream assembly logic 290' has determined that packet 610 contains an IP address and a UDP port of interest, the MPEG TS packets encapsulated within packet 610 are processed. As described earlier in connection with the flowchart of FIG. 6, some embodiments of stream assembly logic 290' examine the Program ID (PID) in the TS packets. The following description applies to such an embodiment. However, a person of ordinary skill in the art will understand how the description below would be modified when PID matching is performed by the decoder module 240 instead of the stream assembly logic 290'. In such a case, the stream assembly logic 290' copies all TS packets to the elementary stream buffer 470, rather than making the copy conditional on the value of the PID field of a TSP packet.

TS packets containing a Program ID (PID) of interest are copied to elementary stream buffer 470, as described below. Stream assembly logic 290' examines TS header 640, which is composed of various fields, including a Program Identifier (PID) 640P. Stream assembly logic 290' examines the contents of PID 640P, and compares the PID to one or more PIDs registered by video playback component 280'. In this scenario, the value of PID 640P is 68, which does match one of the PIDs in registration data 650.

Since the first PID in packet 610 matches, the entire TS packet (header and payload) identified by this PID is copied to the elementary stream buffer 470. MPEG-2 TS packets are fixed-length, but another embodiment uses a length field in the TS header to copy variable length TS packets. Stream assembly logic 290' updates buffer pointers as appropriate, for example, advancing an address or index into elementary stream buffer 470 and advancing another address/index into packet 610.

Stream assembly logic 290' iterates through all TS packets encapsulated within packet 610, copying to elementary stream buffer 470 when the TS packet has a matching PID. A person of ordinary skill in the art should understand how length fields in IP header 620 and/or UDP header 630 are used to determine when all TS packets within packet 610 have been processed.

In this example, the second TS packet has a PID of 42, which is not included in registration data 650. Therefore, the second TS packet is not copied to elementary stream buffer 470. However, in this example a third TS packet (not shown) has a PID of 71, which matches registration data 650, so this third TS packet is copied to elementary stream buffer 470.

In the embodiments of stream assembly logic 290' discussed above, a distinction was drawn between software components and hardware components, with line 410 (FIG. 4) demarcating the division between hardware components. However, no distinction was made between software components executing in user mode and software components executing in kernel mode. A person of ordinary skill in the art should understand that NIC driver 420 and at least portions of protocol stack 430 execute in kernel mode, but stream assembly logic 290' can execute in user mode.

Figure 7:
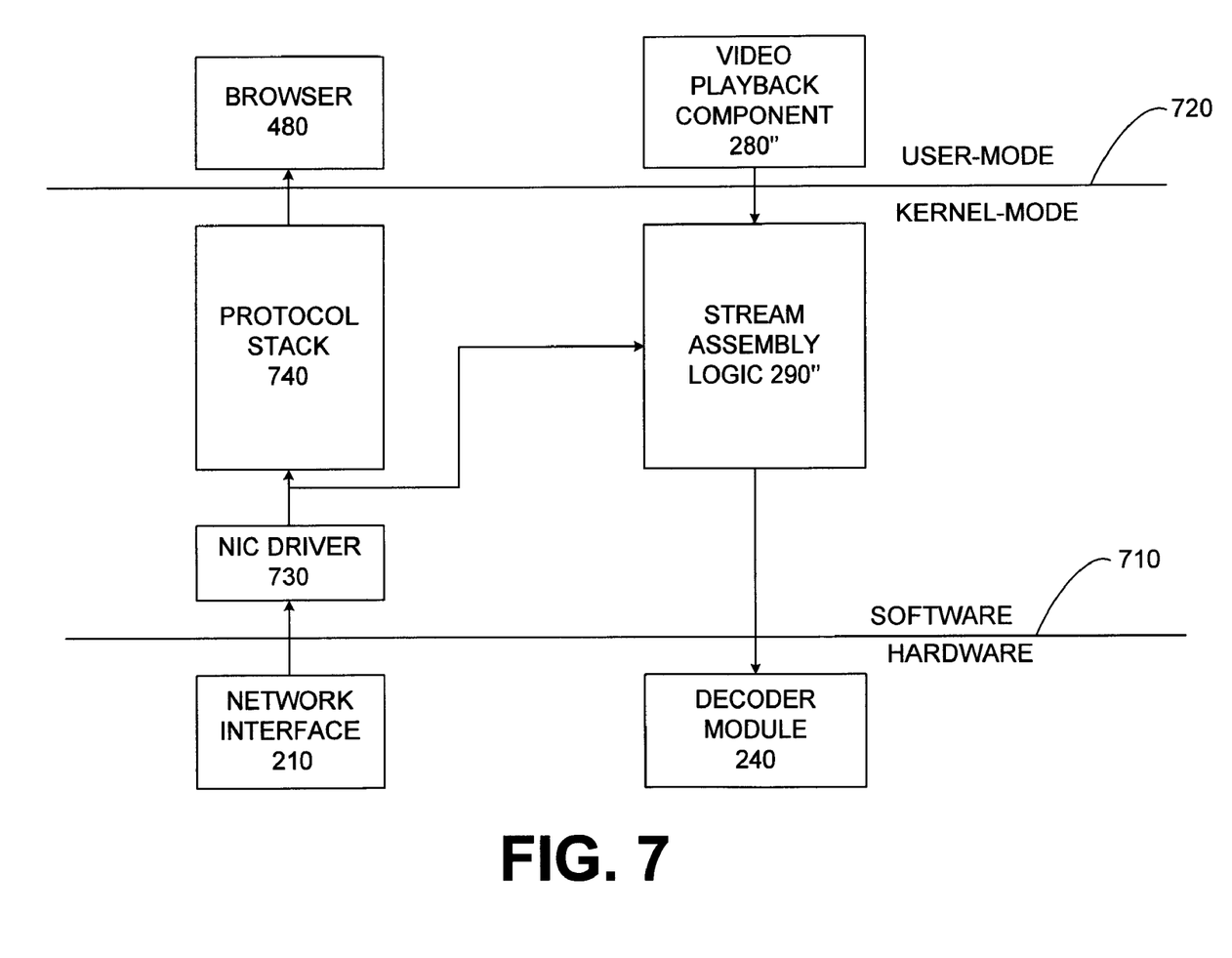
FIG. 7 is a block diagram of various components of the DHCT of FIG. 1 in accordance with a user-mode embodiment of video playback component combined with a kernel-mode embodiment of stream assembly logic.

In other embodiments, stream assembly logic 290 executes in kernel mode and video playback component 280 executes in user mode. FIG. 7 is a block diagram of various components of DHCT 160 in accordance with a user-mode embodiment of video playback component (280'') combined with a kernel-mode embodiment of stream assembly logic (290'). The division between hardware components and software components is represented by line 710 (hardware below and software above). The division between kernel mode and user mode is represented by line 720 (kernel mode below and user mode below). NIC driver 730, protocol stack 740, and stream assembly logic 290" are kernel mode components; video playback component 280" and browser 480 are user mode components.

In contrast with the embodiment of FIG. 4, kernel-mode stream assembly logic 290" bypasses user-mode video playback component 280" and instead delivers the encapsulated MPEG stream to decoder module 240. This avoids several time-consuming operations, including, for example, a context switch between kernel mode and user mode, and a buffer copy between kernel memory and user memory. Kernel mode also offers more efficient buffer management techniques: kernel mode code can use structures such as linked lists and scatter-gather chains to pass packets and frames, while the user-mode receive buffer used by the socket interface is a single, logically contiguous buffer. Additionally, some variations of the kernel-mode stream assembly logic 290" allow some or all of the functions of the protocol stack 430 to be bypassed, the advantages of which have been discussed above in connection with FIGS. 3-6.

As can be seen in FIG. 7, video playback component 280" is bound to stream assembly logic 290", which in turn is bound to NIC driver 730. Protocol stack 740 is also bound to NIC driver 730. As a result, a person of ordinary skill in the art should appreciate that NIC driver 730 dispatches incoming layer-2 packets to both protocol stack 740 and stream assembly logic 290". This allows applications such as browser 480, video games, and text messaging, to coexist in DHCT 160 with stream assembly logic 290". Such applications are able to use the services of protocol stack 740 even though video playback component 280" bypasses protocol stack 740.

In the embodiments described herein, stream assembly logic 290" receives complete layer-2 packets from NIC driver 730, in which the received packets contain a layer-2 header (e.g., Ethernet destination address, Ethernet source address, and Ethernet frame length). In another variation, stream assembly logic 290" receives layer-3 packets from NIC driver 730, in which the layer-2 header has been removed, so that the first bytes in the received packet are the IP header rather than the Ethernet header. Receiving packets with complete layer-2 headers is known as "raw mode," while "cooked mode" refers to packets in which the layer-2 headers have been stripped. Since stream assembly logic 290" does not need the layer-2 header, either raw or cooked packets will work.

Figure 8:
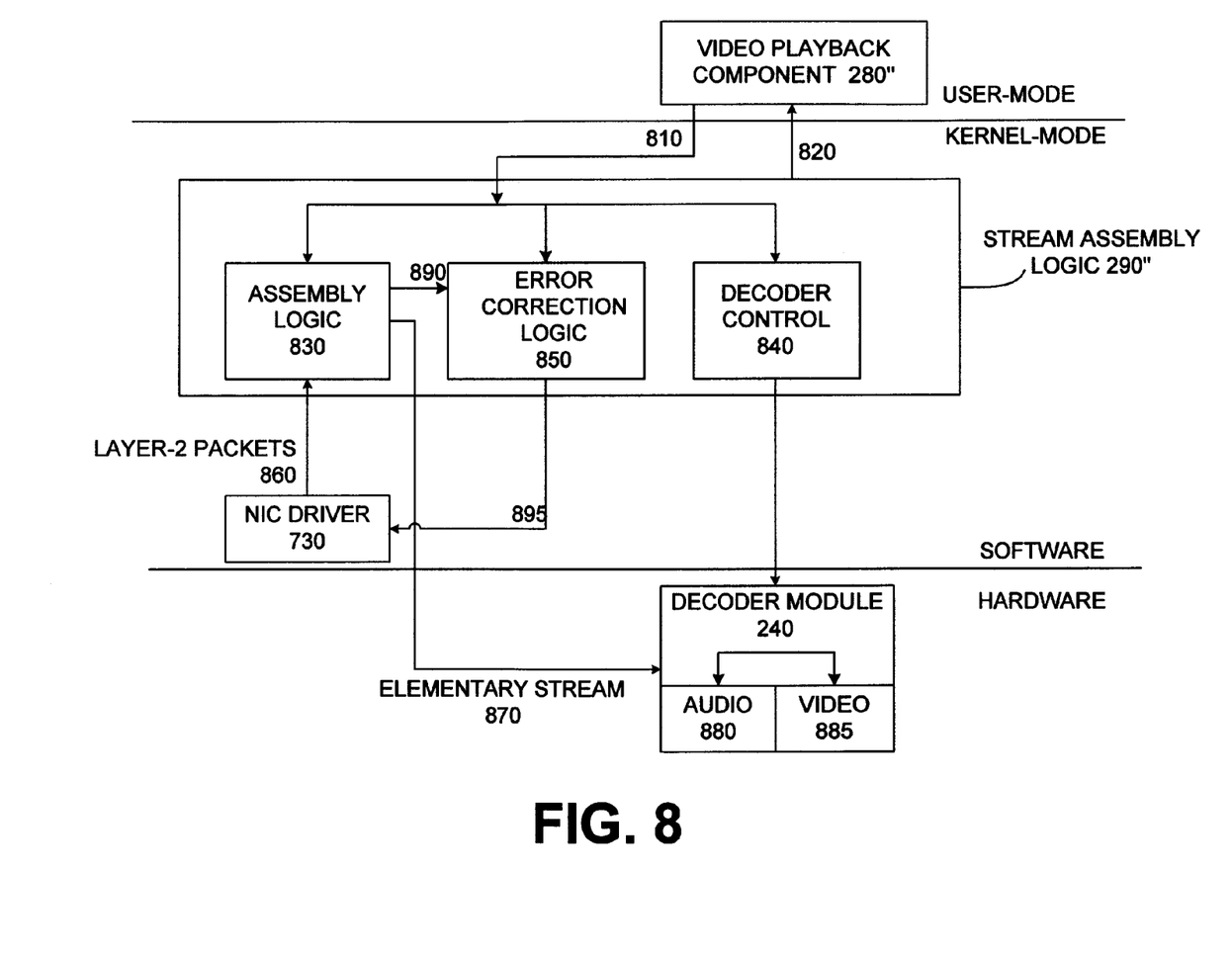
FIG. 8 is a data flow diagram of received IPTV packets moving through an embodiment of DHCT 160 which uses a user-mode video playback component and a kernel-mode stream assembly logic.

FIG. 8 is a data flow diagram of received IPTV packets moving through an embodiment of DHCT 160 which uses user-mode video playback component 280" and kernel-mode stream assembly logic 290". Video playback component 280" starts, stops, and configures the operation of stream assembly logic 290" through interface 810. Stream assembly logic 290" notifies video playback component 280" of events through interface 820. The functionality provided by exemplary embodiments of interfaces 810 and 820 will be described later in connection with FIG. 9.

Stream assembly logic 290" can be divided into several functional blocks: assembly logic 830; decoder control 840; and optional error correction logic 850. Assembly logic 830 receives layer-2 packets (860) from NIC driver 730 and removes the MPEG transport stream (TS) packets encapsulated within. The TS packets are assembled to produce an MPEG elementary stream (870) which is provided to decoder module 240, as described earlier in connection with FIG. 6. In the assembly process, some embodiments of stream assembly logic 290" perform filtering on various network and transport layer headers, so that not all packets received by stream assembly logic 290" become part of the assembled elementary stream. One such filtering process was described earlier in connection with FIG. 5.

Decoder module 240 uses the Program Identifiers (PIDs) contained within each TS packet to demultiplex the stream, delivering each TS packet to a decoder that is appropriate for the PID. For example, audio packets are delivered to an audio decoder 880 while video packets are delivered to a video decoder 885. In some embodiments, decoder module 240 also decrypts the TS packets before decoding.

Decoder control 840 configures operation of decoder module 240. A person of ordinary skill in the art should be familiar with the types of configuration options offered by a decoder module 240. Examples of such options include the type of video output (e.g., NTSC, PAL), the type of window used to displayed the decoded video (e.g., full screen, picture-in-picture, program guide), and the resolution and/or frame speed. In some embodiments, some or all of the configuration options are selected based on information provided to stream assembly logic 290" by video playback component 280", through control interface 810.

Error correction logic 850 provides error correction for a received IPTV packet stream (890), which may involve transmitting packets through path 895. Since the underlying protocols (IP, UDP, and RTP) do not themselves provide error correction, this functionality is useful, but is not necessary. Exemplary embodiments of error correction logic 850 implement forward error correction (FEC) codes, retransmission of RTP packets, or both. A person of ordinary skill in the art should be familiar with FEC codes (e.g., Raptor, Pro-MPEG) and RFC 4588 ("RTP Retransmission Format"). Some embodiments of error correction logic 850 support multiple FEC codes and/or configurable retransmission parameters. Selection of FEC codes and/or retransmission parameters is static (at compile time) in some embodiments and dynamic (at run time) in others.

As described earlier, received packets bypass protocol stack 330. The amount, and type, of packet processing performed by assembly logic 830 is configurable. Because much of the functionality provided by a full IP protocol stack is not necessary in an IPTV environment, packet processing by assembly logic 830 can be very streamlined. IPTV packets are generally too short to be fragmented by the sender's IP layer, so assembly logic 830 can be configured to ignore IP header flags related to reassembly of fragmented IP packets. Assembly logic 830 can also be configured to bypass checksums at the IP, UDP, and/or RTP layer. In some environments, forward error correction (FEC) techniques used at a higher layer render checksums redundant. Even without FEC, checksums can still be bypassed—corrupted video frames can nonetheless be decoded, since the resulting artifacts may be acceptable to the viewer.

Some IPTV environments use RTP to carry MPEG streams, and some do not. Therefore, assembly logic 830 can be configured to expect and strip off RTP headers, or to expect MPEG data rather than an RTP packet to be carried within the UDP packet.

Each of these behaviors of assembly logic 830 is independent and can therefore be a configurable option, although a particular embodiment may not support dynamic configuration. In one embodiment, assembly logic 830 implements a fixed set of options chosen by the system designers. That is, the designer may choose an implementation that includes performing an IP checksum, bypassing a UDP checksum, and expecting no RTP headers. In this case, assembly logic 830 contains no code for bypassing the IP checksum, or performing the UDP checksum, or handling RTP headers.

In another embodiment, assembly logic 830 contains code to implement multiple options, but the set of options is statically defined at compile time. This allows different build configurations to support different sets of options through the use of build or compiler flags.

In yet another embodiment, the set of options is determined at run-time by stream assembly logic 290", for example, based on the capabilities of DHCT 160, broadband subscriber connection 150, IP network 140, and/or program source encoders 120. In yet another embodiment, the set of options is determined by an application such as video playback component 280", and communicated to assembly logic 830 through control interface 810.

Figure 9:
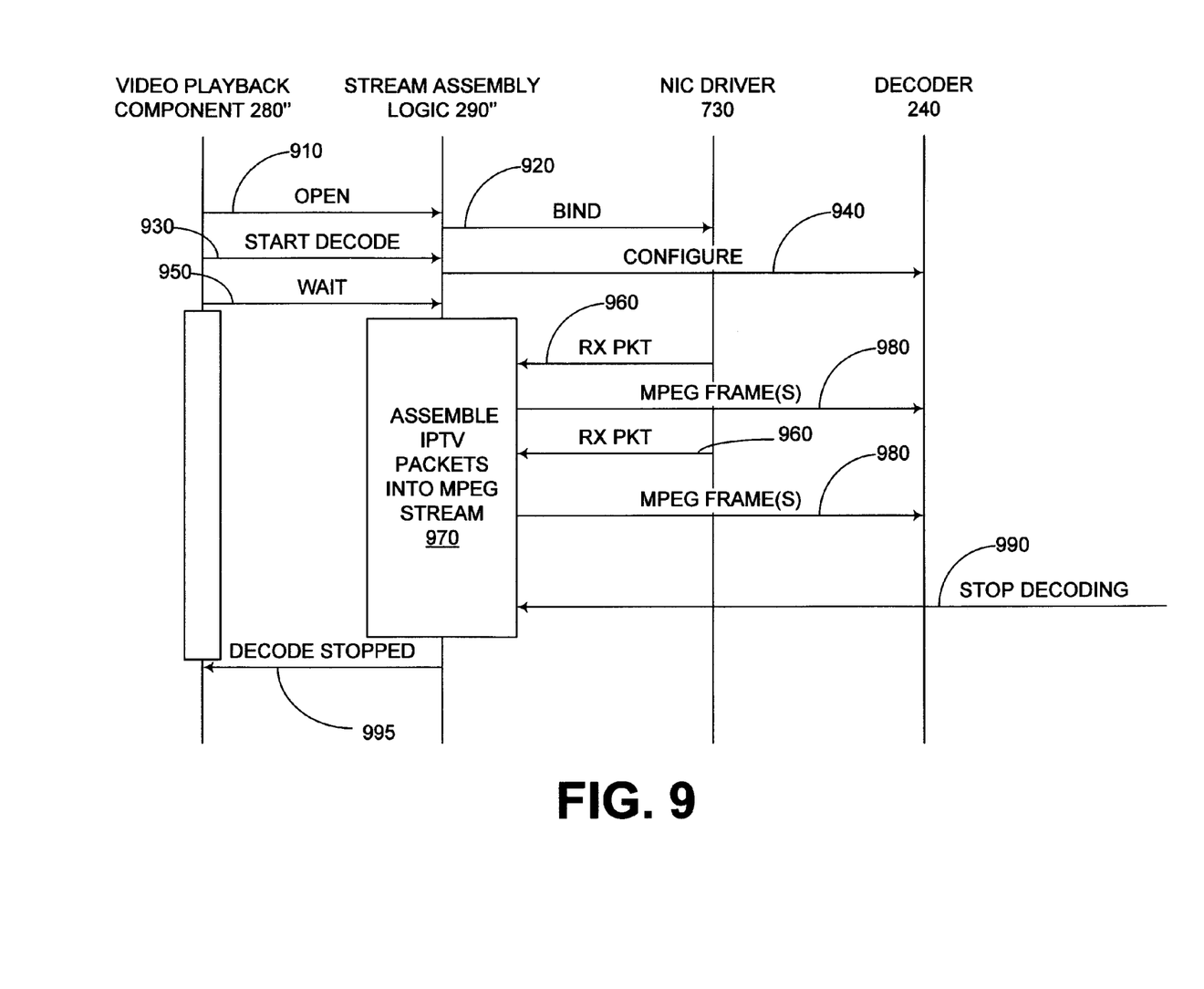
FIG. 9 is a diagram showing an exemplary interaction between various components of DHCT 160 when receiving IPTV packets.

FIG. 9 is a diagram showing an exemplary interaction between various components of DHCT 160 when receiving IPTV packets. Video playback component 280" opens (910) an interface to stream assembly logic 290". In response, stream assembly logic 290" binds (920) to NIC driver 730, so that received IPTV packets are supplied to stream assembly logic 290". (In some embodiments, binding between NIC drivers and protocol stacks such as stream assembly logic 290" occurs at boot time; in this case, operation 920 is not a "bind", but instead starts packet data flow between stream assembly logic 290" and NIC driver 730.)

Video playback component 280" instructs stream assembly logic 290" to start decoding IPTV packets (930). In response, stream assembly logic 290" configures (940) decoder module 240. Decoder configuration was discussed above in connection with FIG. 8. After start instruction 930, video playback component 280" waits (950) for a notification from stream assembly logic 290". In some embodiments, wait 950 is a blocking operation. In other embodiments, video playback component 280" polls for notifications from stream assembly logic 290".

After start instruction 930, NIC driver 730 provides (960) received IPTV packets to stream assembly logic 290". Stream assembly logic 290" performs stream assembly (970) by removing the MPEG transport stream (TS) packets encapsulated within the IPTV packets and assembling the TS packets to produce an MPEG elementary stream. (The assembly process was described earlier in connection with FIGS. 5 and 6.) The MPEG elementary stream is provided (980) to decoder module 240. Although not shown in FIG. 9, if received packets contain errors then error correction logic 850 takes appropriate actions to correct the errors.

In the example scenario of FIG. 9, stream assembly logic 290" receives a "stop decoding" event (990). A person of ordinary skill in the art should recognize that stopping the decoder is an appropriate response to a variety of system and/or user events. As one example, a navigator application may send stop decoding event 990 in response to a channel change request from the user. Other examples include an emergency alert notification, notification of the end of an auto-tune event, and the end of a scheduled recording event. In some embodiments, data received after stop decoding event 990 is discarded.

Stream assembly logic 290" notifies (995) video playback component 280" after event 990. In the embodiment of FIG. 9, wait operation 950 is shown as blocking, so notification 995 takes the form of unblocking the wait operation 950. In a non-blocking embodiment, notification 995 may be asynchronous instead.

In one embodiment, DHCT 160 runs a variation of Unix or Linux as an operating system, and stream video playback component 280" interacts with stream assembly logic 290" through a socket interface. In such an embodiment, "open" operation 910 corresponds to the API call socket( ), "bind" operation 920 corresponds to the API call bind( ), "start packet processing" operation 930 corresponds to the API call ioctl( ), and "wait" operation corresponds to the API call "receive".

Figure 10:
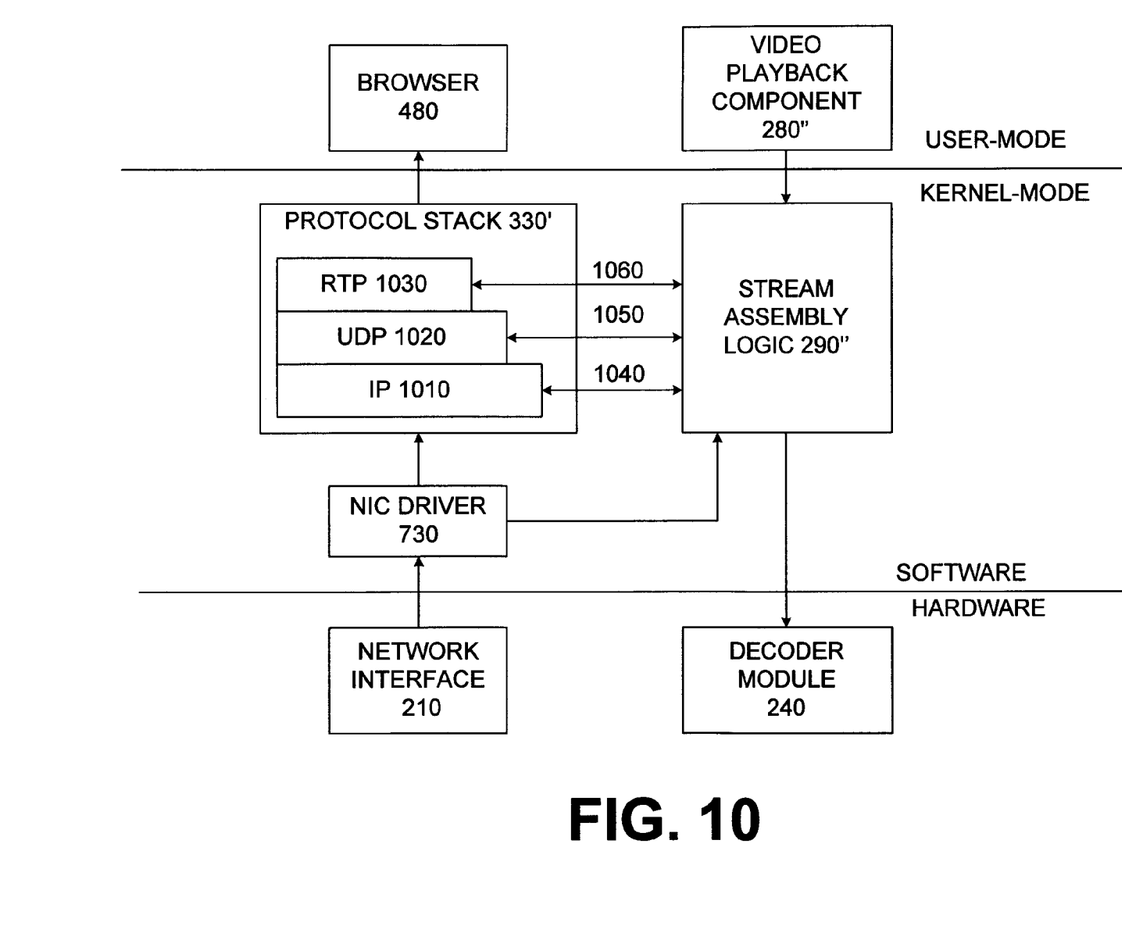
FIG. 10 illustrates an alternative embodiment in which the stream assembly logic of FIG. 7 relies on services provided by a protocol stack to implement selective protocol layer processing.

In the embodiment of FIG. 8, processing of received IPTV packets completely bypasses protocol stack 330, so that any layer-3, layer-4, and layer-5 processing that takes place (e.g., checksums) is performed by stream assembly logic 290". FIG. 10 illustrates an alternative embodiment in which stream assembly logic 290" relies on services provided by protocol stack 330' to implement selective protocol layer processing. IP layer 1010, UDP layer 1020, and RTP layer 1030 each expose a packet interface (1040, 1050, and 1060, respectively). Stream assembly logic 290" passes an IP packet to IP layer 1010 through interface 1040, and IP layer 1010 performs layer-3 processing on the packet. Such processing might include, for example, an IP checksum but no reassembly. The specific type of processing performed on the packet may be specified as a parameter with each call to the interface 1040, or the packet processing may be configured once before the interface 1040 is used, through a separate control interface (not shown). UDP packets and RTP packets are processed in a similar manner through packet interfaces 1050 and 1060.

A person of ordinary skill in the art should realize that although a conventional protocol stack does not offer the above-described functionality, a custom stack can be built. Such a custom stack would perform non-standard packet processing in the IP, UDP, and RTP layers, as controlled through exposed interfaces 1040-1060.

Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed.

Obvious modifications or variations are possible in light of the above teachings. The implementations discussed, however, were chosen and described to illustrate the principles of the disclosure and its practical application to thereby enable a person of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method, performed in a digital home communication terminal (DHCT), of assembling a multimedia transport stream from a layer-2 packet, the method comprising the steps of:
    receiving, in kernel mode, a command from a user mode video playback component;
    in response to the received command, processing, in kernel mode, layer-2 packets received through a binding to a network interface driver in order to assemble multimedia transport packets encapsulated within the received layer-2 packets into an MPEG elementary stream, wherein the processing includes applying at least one filter to the received layer-2 packets and assembly only includes multimedia packets meeting the applied filter criteria;
    copying the multimedia packets that did not meet the applied filter criteria to a protocol stack; and
    supplying the MPEG elementary stream to a decoder.

2. The method of claim 1, further comprising the step of:
    after receiving the command, blocking the execution of the user mode video playback component.

3. The method of claim 1, further comprising the steps of:
    after receiving the command, blocking the user mode video playback component; and
    unblocking the execution of the user mode video playback component in response to receiving a stop decoder event.

4. The method of claim 1, further comprising the step of:
    performing a checksum on at least one of an IP packet, a UDP packet, or an RTP packet contained within one of the received layer-2 packets.

5. The method of claim 1, further comprising the step of:
    conditionally performing a checksum on at least one of an IP packet, a UDP packet, or an RTP packet contained within one of the received layer-2 packets, based on a configuration option.

6. The method of claim 1, further comprising the step of:
    conditionally performing a checksum on at least one of an IP packet, a UDP packet, or an RTP packet contained within one of the received layer-2 packets, based on a configuration option specified by the user mode video playback component.

7. The method of claim 1, further comprising the step of:
    performing, in kernel mode, forward error correction on the received layer-2 packets.

8. The method of claim 1, further comprising the step of:
    configuring the decoder based on at least one option specified by the user mode video playback component.

9. A digital home communication terminal (DHCT) comprising:
    a network interface;
    memory having stored thereon program code; and
    a processor that is programmed by at least the program code to enable the client DHCT to:
        receive, in kernel mode, a command from a user mode video playback component;
        in response to the received command, process in kernel mode layer-2 packets received through a binding to a network interface driver in order to assemble multimedia transport packets encapsulated within the received layer-2 packets into an MPEG elementary stream, wherein the processing includes applying at least one filter to the received layer-2 packets and assembly only includes multimedia packets meeting the applied filter criteria;
        copy the multimedia packets that did not meet the applied filter criteria to a protocol stack; and
        supply the MPEG elementary stream to a decoder.

10. The DHCT of claim 9, wherein the processor is further programmed to enable the client DHCT to:
    block the execution of the user mode video playback component after receiving the command.

11. The DHCT of claim 9, wherein the processor is further programmed to enable the client DHCT to:
    block the user mode video playback component after receiving the command; and unblock the execution of the user mode video playback component in response to receiving a stop decoder event.

12. The DHCT of claim 9, wherein the processor is further programmed to enable the client DHCT to:
    perform a checksum on at least one of an IP packet, a UDP packet, or an RTP packet contained within one of the received layer-2 packets.

13. The DHCT of claim 9, wherein the processor is further programmed to enable the client DHCT to:
    conditionally perform a checksum on at least one of an IP packet, a UDP packet, or an RTP packet contained within one of the received layer-2 packets, based on a configuration option.

14. The DHCT of claim 9, wherein the processor is further programmed to enable the client DHCT to:
    conditionally perform a checksum on at least one of an IP packet, a UDP packet, or an RTP packet contained within one of the received layer-2 packets, based on a configuration option specified by the user mode video playback component.

15. A digital home communication terminal (DHCT) comprising:
    a processor, the processor configured with:
        logic configured to receive, in kernel mode, a command from a user mode video playback component;
        logic configured to process in kernel mode layer-2 packets received through a binding to a network interface driver in order to assemble multimedia transport packets encapsulated within the received layer-2 packets into an MPEG elementary stream, where the kernel-mode processing is performed in response to the received command, wherein the processing includes applying at least one filter to the received layer-2 packets and assembly only includes multimedia packets meeting the applied filter criteria;
    logic configured to copy the multimedia packets that did not meet the applied filter criteria to a protocol stack; and
    logic configured to supply the MPEG elementary stream to a decoder.

16. The DHCT of claim 15, wherein the processor is further comprising:
    logic configured to block the execution of the user mode video playback component after receiving the command.

17. The DHCT of claim 15, wherein the processor is further comprising:
   logic configured to perform a checksum on at least one of an IP packet, a UDP packet, or an RTP packet contained within one of the received layer-2 packets.

18. The DHCT of claim 15, wherein the processor is further comprising:
   logic configured to perform forward error correction on the received layer-2 packets in kernel-mode.

19. The DHCT of claim 15, wherein the processor is further comprising:
   logic configured to configure the decoder based on at least one option specified by the user mode video playback component.

20. The DHCT of claim 15, wherein the processor is further comprising:
   logic configured to conditionally perform a checksum on at least one of an IP packet, a UDP packet, or an RTP packet contained within one of the received layer-2 packets, based on a configuration option.

* * * * *